United States Patent [19]
Mangum

[11] 3,734,196
[45] May 22, 1973

[54] LAWN EDGER

[76] Inventor: Elmus F. Mangum, 200 N. Ravinia, Dallas, Tex. 75211

[22] Filed: Sept. 3, 1971

[21] Appl. No.: 177,770

[52] U.S. Cl. ................................... 172/16, 56/17.1
[51] Int. Cl. .............................................. A01d 35/00
[58] Field of Search ........................... 172/13–18; 56/10.1, 17.1, 17.2, 256

[56] References Cited

UNITED STATES PATENTS

| | | | |
|---|---|---|---|
| 3,594,997 | 7/1971 | Tubesing | 56/17.1 |
| 3,171,497 | 3/1965 | Haigh | 56/256 X |
| 2,938,323 | 5/1960 | Livingston et al. | 56/17.2 X |
| 2,739,437 | 3/1956 | True | 172/15 |
| 3,656,555 | 4/1972 | Johns, Sr. et al. | 172/16 |
| 3,079,743 | 3/1963 | Egley | 172/15 X |
| 3,075,338 | 1/1963 | Reid | 56/10.1 |

Primary Examiner—Robert E. Pulfrey
Assistant Examiner—R. T. Rader
Attorney—Cecil L. Wood et al.

[57] ABSTRACT

A frame, supported by front and rear wheels, has a gasoline powered motor rigidly mounted thereon with a horizontal drive shaft. The cutter carriage is in the form of a base plate rotatably supported on the motor drive shaft for vertical oscillating movement. The cutter blade is secured to a driven shaft rotatably supported at the front of the carriage about a horizontal axis disposed generally in the vertical plane of the front wheel axis. A carriage guide finger prevents engagement of the cutter blade with the edge of a pavement. The edger is maneuvered by a handle attached to the frame; and control means, operated at the handle, provide for positioning the height of the cutter blade relative to the supporting frame.

9 Claims, 6 Drawing Figures

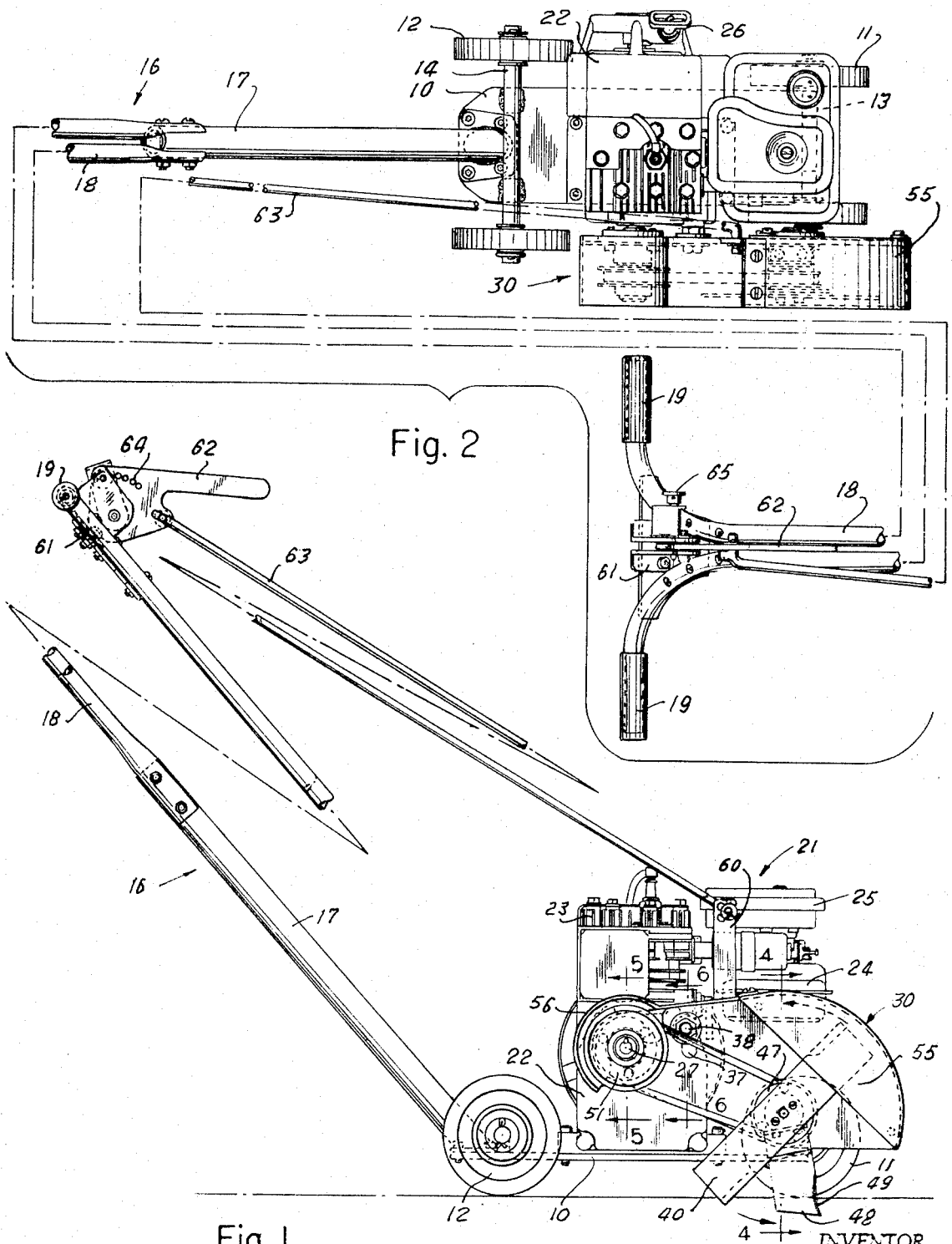

INVENTOR
Elmus F. Mangum

BY

ATTORNEYS

LAWN EDGER

BACKGROUND AND SUMMARY OF THE INVENTION

This invention relates to an edger for trimming turf along the edges of paved areas such as sidewalks or curbs, and around the edges of flower beds and the like.

A principal object of this invention is to provide an improved lawn edger which is rugged in construction, which is easy to manipulate and control, and which is particularly adapted for safe and convenient use to accurately trim edges of relatively small radius.

Another object of this invention is to provide an edger with a sturdy mounting for the cutter blade for accurate positioning of the cutter blade relative to the edger frame, to facilitate the accurate trimming of turf by the user.

A further object of this invention is to provide an edger having an improved guide means for protecting the cutter blade from engagement with a pavement edge, and for deflecting the plant blades into the path of the cutter blade.

These objects are accomplished in apparatus which includes broadly a frame having front and rear supporting wheels and an attached handle for maneuvering of the apparatus by an operator. A drive motor mounted on the frame has a horizontal drive shaft projecting from one side of the apparatus. A cutter carriage is rotatably mounted at one end on the drive shaft for limited rotation about the drive shaft, and a cutter is rotatably mounted at the other end of the cutter carriage about a parallel axis, with drive means coupling the drive shaft and cutter for rotation of the cutter. A control means on the handle oscillates the cutter carriage to select the height of the cutter axis relative to the apparatus frame. In more detail the apparatus includes frictionless bearings rotatably supporting both the cutter carriage and the cutter, with the cutter being disposed generally in the vertical plane of one of the front or rear supporting wheel axes.

The novel features and the advantages of the invention, as well as additional objects thereof, will be understood more fully from the following description when read in connection with the accompanying drawings.

DRAWINGS

FIG. 1 is a side elevation view of an edger according to the invention;

FIG. 2 is a view from the top of the edger of FIG. 1;

DESCRIPTION OF THE PREFERRED EMBODIMENT

Figure 3:
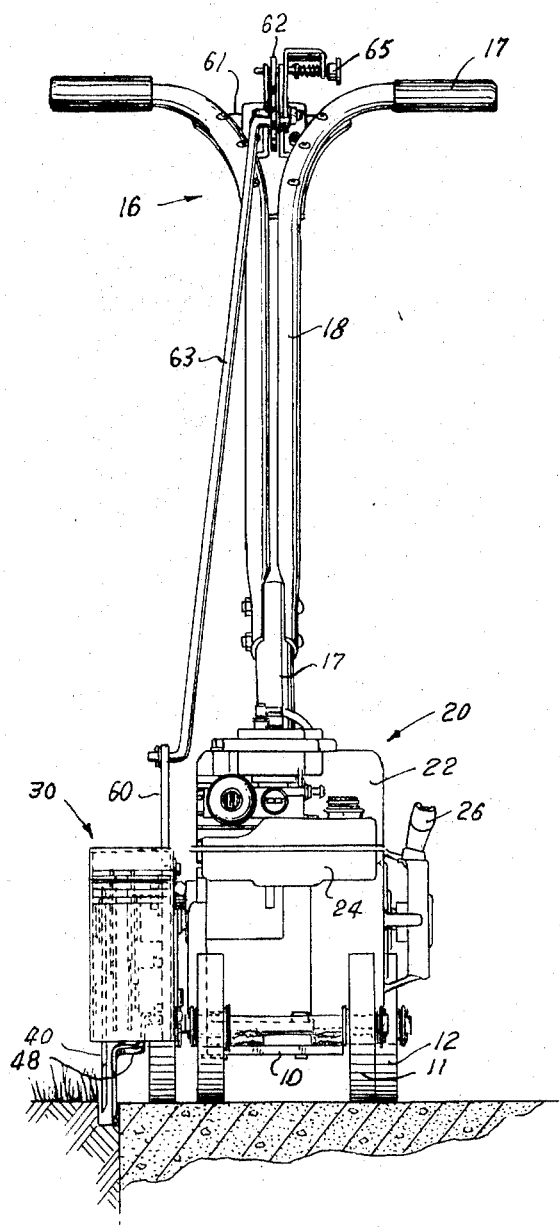
FIG. 3 is a front elevation view of the edger of Fig. 1, in relation to a paved surface.

The edger includes a base carriage 10 in the form of a horizontal plate supported on a pair of front wheels 11 and a pair of rear wheels 12. The front wheels are rotatably supported in spaced relation on a front axle 13 which is rigidly secured to the base carriage 10 by means of welding or any other suitable means. Similarly, as best seen in FIG. 2, the rear wheels are rotatably supported on a rear axle 14 secured to the base carriage by welding or other suitable means. The axial spacing of the rear wheels may be greater than that of the front wheels to provide for lateral stability of the edger.

The base carriage extends rearwardly beyond the rear axle to provide for the mounting of a rearwardly and upwardly extending handle 16 which, in the illustrated form, includes an elongated tubular base member 17 having an inclined flange which is bolted to the base carriage, and a pair of extension members 18, bolted to the base member, and bent outwardly to form T grips 19 to be grasped by the operator of the edger. The motor 21 is a conventional single cylinder internal combustion motor which is suitably bolted to the base carriage 10. As shown in the drawings, the motor includes a housing 22 including a cylinder head 23, fuel tank 24, air filter 25 and starter cord 26. The motor output shaft 27 extends from the right side of the housing 22 as best seen in FIG. 1. Controls for adjusting the motor speed are associated with the motor carburetor.

Figure 5:
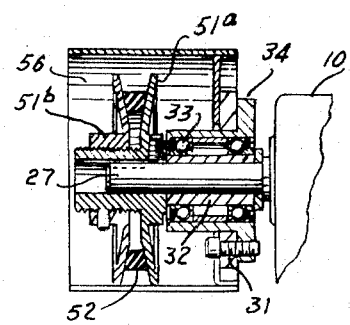
FIG. 5 is a fragmentary sectional view, as wieved in the plane 5—5 of FIG. 1, illustrating the cutter blade carriage and drive pulley mounting.

As best seen in FIG. 5, the cutter blade carriage 30 includes a base plate 31 which is rotatably supported in a vertical plane about the motor output shaft 27. The cutter carriage is rotatably supported by means of a double bearing assembly which includes an inner sleeve 32 carried by the motor output shaft, a flanged housing 34 separated by a pair of axially spaced ball bearing units 33. The carriage plate is provided with an opening which accommodates the flanged housing 34 and is bolted to the flange of this housing. This bearing assembly then defines the rotational axis for the cutter carriage 30.

Figure 6:
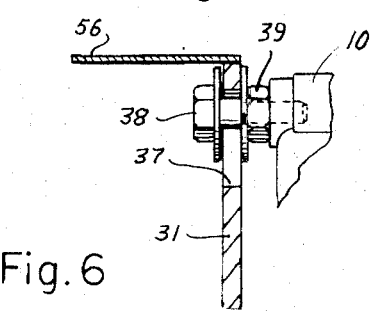
FIG. 6 is a fragmentary sectional view, as viewed in the plane 6—6 of FIG. 1, illustrating an additional detail of the cutter blade carriage mounting.

The cutter carriage is further supported relative to the motor 10 by means of a bolt-slot coupling as best seen in FIGS. 1 and 6. The carriage plate 31 is provided with an arcuate slot 37 provided intermediate the ends of the plate along an arc at a common radius relative to the axis of rotation. A bolt 38, which extends through the slot 37, is threaded into an appropriate threaded hole in the motor housing 10; and a lock nut 39 secures the bolt in the assembly. The carriage plate 31 is then confined between suitable bearing members such as washers to permit upward and downward rotational movement of the carriage about its axis but to substantially prevent any lateral movement of the carriage.

Figure 4:
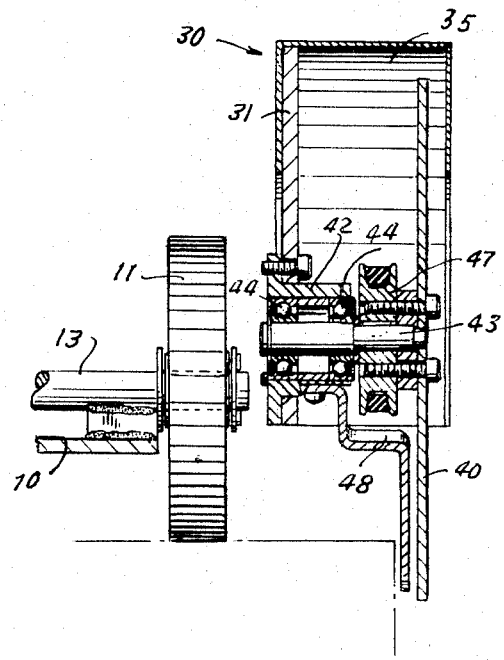
FIG. 4 is a fragmentary sectional view, as viewed in the plane 4—4 of FIG. 1, particularly illustrating the cutter blade mounting.

As best seen in FIG. 4, the cutter blade 40 is rotatably supported on a bearing-stub shaft assembly mounted on the carriage 30 adjacent to its forward end. The assembly includes a flanged bearing housing 42 and a stepped stub shaft 43 rotationally separated by a pair of axially spaced ball bearing units 44, with the inner races of the ball bearing units carrying the larger end of the stepped stub shaft 43. The carriage plate 31 is provided with an opening to accommodate the cylindrical portion of the bearing housing 42, with the housing flange being bolted to the carriage plate. The bearing housing then projects outwardly from the plate 31, with the smaller portion of the stub shaft projecting outward beyond the bearing housing.

A driven V-belt pulley 47 is non-rotatably mounted on the smaller end of the stub shaft by means of a key; and the cutter blade 40 is non-rotatably fixed to the pulley 47 by means of suitable cap screws, for example.

A pavement guard 48 in the form of a relatively heavy gauge metal strap has a horizontal arm rigidly bolted to the bearing housing 42, and has a downwardly extending vertical arm which is disposed adjacent to the plane of rotation of the cutter blade 40 and which has a length to extend downward approximately to the peripheral arc of the cutter blade. This guard then is always in position to protect the cutter blade from engagement with the edge of a pavement. The pavement guard is provided with a beveled leading edge surface 49 for the purpose of deflecting blades of grass or other growth from positions adjacent to the pavement edge into the path of the cutter blade.

The drive pulley 51 is an adjustable V-belt pulley, having an inner half 51a non-rotatably fixed to the outer end of the motor drive shaft 17 by means of a key and axially locked by means of a set screw. The outer pulley half 51b is threaded onto the hub portion of the inner pulley half, and locked thereto by means of a set screw, whereby the width of the V-belt valley may be changed to adjust the tension of the V-belt 52 extending between the drive and driven pulleys. Since the drive pulley and the cutter blade carriage rotate about a common axis, it will be seen that the belt tension does not change in use except to the extent that the belt may stretch or wear over a relatively long period of use.

The cutter blade carriage includes a forward guard 55 for partially enclosing the rotating blade to protect against injury to the operator, and a rearward guard extension 56 to partially enclose the drive pulley and the V-belt. These guards also serve to limit the dispersal of the cuttings which are normally thrown forward from the cutter blade.

It will be seen that the rotation of the cutter blade carriage relative to the motor housing is limited by the above described bolt-slot coupling. A manual control is provided for selecting and locking the carriage 30 in a desired rotational position to thereby fix the depth of cut of the cutter blade relative to the plane of the pavement or ground on which the edger is supported. This control includes an arm 60 which is rigidly attached to and extends upwardly from the carriage plate 31. A control bracket 61 is bolted to the handle 16 adjacent to the T grips 19, and provides a transverse pivot axis for a control arm 62 for movement in a plane substantially parallel to that of the carriage plate 31. A rigid control rod 63 is pivotally connected between the carriage arm 60 and the control arm 62.

The control arm 60 is provided with a row of spaced holes 64 arranged on an arc on a common radius relative to its pivot axis, and a spring biased laterally guided and movable pin 65 is mounted on the control bracket 61 for insertion in a selected hole 64. It will be seen then that rotation of the control arm 62 will produce corresponding rotation of the cutter blade carriage 30; and the desired height of the cutter blade may be selected and fixed by means of the locking pin 65.

While the overall operation of the edger is generally apparent from the foregoing description, it should be noted that the maneuvering of the unit along a pavement or turf edge having a relatively small radius is made particularly ease because of the spaced pair of front wheels and the position of the cutter blade axis in the same transverse vertical plane with the front wheel axel. The operator merely raises the rear wheels slightly, and the edger remains stable while the height of the cutter blade remains unchanged relative to the surface. The edger is then easily maneuvered around the curved edge for precise trimming.

A feature of the invention is the rugged and stable four-wheel frame mounting along with the rigidly mounted cutter carriage to provide for good stability and control while trimming along the edge of a paved surface. Stability is assured when the edger is tilted by the operator to ride only on either the front wheels or rear wheels.

Another feature and advantage of the invention is that the cutter blade axis is generally in the same transverse vertical plane as the axis of the front supporting wheels so that the edger is readily pivoted in use by lifting the rear wheel slightly from the surface to permit the accurate trimming of edges having relatively small radius.

Still another feature of the invention is the provision of an improved guide arm for guiding the edger along the edge of a paved surface and for simultaneously protecting the blade from being damaged from engagement with the paved surface and also deflecting prime blades into the path of the cutter.

A further feature of the invention is the convenient and safe control for adjusting and securing the height of the cutter blade.

A still further feature is the improved bearing and support arrangement both for the cutter carriage and the cutter blade.

While the preferred embodiment of the invention has been illustrated and described, it will be understood by those skilled in the art that changes and modifications may be resorted to without departing from the spirit and scope of the invention.

What is claimed is:

1. Lawn edging apparatus comprising
   a frame; front and rear wheels mounted on said frame for supporting the apparatus on a working surface, including two wheels rotatable about a common axis; elongated upward and rearward extending handle means mounted on said frame for maneuvering of the apparatus by an operator;
   a drive motor mounted on said frame having a horizontal drive shaft projecting from one side thereof, parallel to said common wheel axis;
   a cutter carriage rotatably mounted, at one end, on said drive shaft for limited rotation about the drive shaft axis; a cutter rotatably mounted at the other end of said cutter carriage about an axis parallel to that of said drive shaft and said common wheeel axis, said cutter carriage including guard means for preventing the engagement of a pavement edge by the cutter; ; drive means coupling said drive shaft and said cutter for rotation of said cutter by said motor;
   said cutter being supported with its axis of rotation disposed generally in the vertical plane of said common wheel axis, with the cutter rotatable in a generally vertical plane adjacent to one support wheel on said common wheel axis whereby the edging apparatus may be turned on short radius curves due to the cutter location by lifting either the front or rear wheels and maneuvering the apparatus;
   and means for positioning said cutter carriage relative to said motor to select the height of the cutter axis relative to said frame.

2. Apparatus as set forth in claim 1 including coupling means acting between the motor housing and the cutter carriage, intermediate the ends of the cutter carriage, for guiding and limiting cutter carriage oscillation relative to said frame.

3. Apparatus as set forth in claim 2
wherein said cutter carriage comprises a relatively heavy base plate rotatably mounted on the drive shaft by means of a pair of axially spaced bearings; and wherein said coupling means comprises an arcuate slot formed in said base plate at a uniform radius relative to the axis of rotation, and guide means mounted on said motor housing and extending through said arcutate slot to laterally confine said base plate.

4. Apparatus as set forth in claim 1
including a stub-shaft-bearing assembly for rotatably supporting said cutter on said cutter carriage; said assembly comprising a bearing housing supporting a pair of axially spaced bearings and a stub-shaft rotatably supported and confined in said bearing housing and extending beyond said housing; means non-rotatably mounting said cutter on said stub-shaft;

and said drive means being means coupling said drive shaft and said stub-shaft.

5. Apparatus as set forth in claim 4
said drive means including a V-pulley mounted on said stub-shaft, an adjustable groove V-pulley mounted on said drive shaft, and a V-belt coupling said V-pulleys.

6. Apparatus as set forth in claim 1
said guard means comprising a guard arm extending downward from said carriage in a plane parallel to and adjacent to the cutter plane on the inside thereof, for preventing engagement of a pavement edge by the rotating cutter.

7. Apparatus as set forth in claim 6
wherein said guard arm is provided with a beveled edge at its leading edge adjacent to the lower extremity thereof for deflecting material into plane of the cutter blade.

8. Apparatus as set forth in claim 1
control means including an oscillating lever pivotally mounted on said handle adjacent to the upper extremity thereof, and a rigid link coupling said oscillating lever and said cutter carriage, whereby said cutter carriage is oscillated through operation of said lever; and means for locking said oscillating lever in a selected position to fix the height of the cutter axis relative to said frame.

9. Apparatus as set forth in claim 1
said supporting wheels including two front wheels, and said common axis being the axis of rotation of said front wheels.

* * * * *